United States Patent Office 3,276,316
Patented Oct. 4, 1966

3,276,316
PROCESS FOR POLARIZING ULTRAVIOLET LIGHT UTILIZING ORIENTED POLYMER SHEET WITH INCORPORATED DICHROIC FLUORESCENT DYE
Albert S. Makas, Medford, Mass., assignor to Polaroid Corporation, Cambridge, Mass., a corporation of Delaware
No Drawing. Filed Aug. 2, 1961, Ser. No. 128,675
2 Claims. (Cl. 88—65)

This invention relates to light-polarizing devices and to methods for making the same.

This invention has for its primary objects novel light-polarizing devices and a novel method of preparing same.

One object of this invention is to provide a novel, colorless, visually transparent polarizer for the ultraviolet region.

Another object of this invention is to provide a novel polarizer for the ultraviolet region that also provides polarized fluorescent light.

Another object is to provide a novel process for manufacture of polarizers of the character described wherein the molecules of a polymeric sheet are oriented to substantial alignment and in which a dye or stain of the brightener or fluorescent type is incorporated therein.

Still another object is to provide a novel display device comprising oriented segments of fluorescing materials, in combination with a rotatable, ultraviolet polarizer to vary the intensity of fluorescence of the materials.

A further object of the invention is to provide an ultraviolet light absorber comprising a substantially uniaxial sheet of polymer having its optic axis in the plane of the sheet and having incorporated therein an oriented sorption complex of a fluorescent dye.

Other objects of this invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure, and the scope of the application of which will be indicated in the claims.

For some time there has been need for an efficient light polarizer for the ultraviolet region. However, the problem has been in finding a suitable dichroic material to polarize the wavelengths of the radiation in the ultraviolet region with a good dichroic ratio (ratio of component densities). In the present invention a method has been found to prepare efficient polarizers for that spectral region.

It has been found that an efficient ultraviolet polarizer can be prepared by the application of a dye of the so-called brightener or fluorescent type to a molecularly oriented polymeric sheet, whereby orientation of the dye is induced by the orientation of the sheet, resulting in a dichroic product. The resulting polarizer shows dichroism in the 240 to 400 m$\mu$ region, with major spectral bands of dichroism occurring in the 50 to 70 m$\mu$ region.

When ultraviolet light or bright daylight is the incident radiation, the polarizers of this invention also show, as extraneous radiation, a bifluorescence in spectral regions other than that of the incident light. Such bifluorescence is the transmitted component of the absorbed ultraviolet light and is observable since the sheet is not visually absorbant. This emitted pale fluorescence is also polarized. In visual polarizers extraneous radiation is often accompanied by a resulting loss of efficiency of the polarizing system. However, in the polarizers of the present invention the efficiency is not impaired by this bifluorescent phenomenon.

The polarizer of the present invention exhibits positive dichroism for both the ultraviolet and fluorescent light, that is, the absorption axis for the incident light is parallel to the stretch axis of the polymeric sheet.

In a preferred embodimnet, a polymeric film, for example polyvinyl alcohol extended to about four times its cast length, is placed in an aqueous solution of the brightener or fluorescent dye until the polymeric film is completely swelled. The film is then stretched to the desired degree and dried. The resulting polarizer is substantially colorless and completely visually transparent.

The polymeric sheet or film used in forming the polarizers of this invention may be any of certain organic plastic materials capable of molecular orientation, for example cellulose or polyvinyl alcohol. In a preferred embodiment polyvinyl alcohol is used. Prior to imbibing the films with the dye they are preferably extended to about four times the cast length, although this is not critical. After the film has been swelled in the dye solution it is again stretched, preferably to its elastic limit, although the extent of stretching is not critical and depends to a great extent upon the desired mechanical stability of the finished polarizer, which is governed partly by the thickness of the film.

Dyes useful in this invention are optical brightener or fluorescent-type dyes that absorb strongly in the ultraviolet region, have no appreciable absorption in the visible region of the spectrum, are capable of being oriented, and contain chromophoric groups capable of orientation, so that absorption of incident light on the polarizer is consistent with the orientation. Such dyes absorb strongly incident ultraviolet radiation whose electric vector is parallel to the stretch axis, transmitting it, at another wavelength, as a pale blue fluorescence. Incident ultraviolet radiation vibrating at a 90° angle to the stretch axis is transmitted substantially unaffected.

As examples of dyes that are useful in this invention, mention may be made of: Brightener R/450, Brightener GO conc. (G465), and Brightener A (Fluorescent Brightener No. 33), all sold by General Aniline and Film Corp., N.Y., N.Y.; Pontamine White BR (Fluorescent Brightener No. 30) C.I. 40600, Paper White BN (Fluorescent Brightener No. 28), and Fluorescent Brightener Agent No. 28, NE 3353, all sold by E. I. du Pont de Nemours & Company, Inc., Wilmington, Delaware; Blancophor BA, Blancophor A–3 (Fluorescent Brightener No. 66), all sold by Antara Chemical Company, division of General Aniline and Film Corp., N.Y., N.Y.; and Leucophor B conc. (Fluorescent Brightener No. 32) C.I. 40620 sold by Sandoz, Inc., N.Y., N.Y.

Although the preferred method of applying the dye is by immersing the film in an aqueous solution of the dye, it should be understood that it may be applied in any number of ways, e.g., spraying, or by means of an applicator. It is also possible to add the dye to a solution of the polymer, then cast the film and orient as above.

The concentration of the aqueous dye solution may be varied over a wide range from a minimum of about 10% to a maximum of saturation, depending upon the solubility of the particular dye and the desired density of the finished polarizer. The immersion time and temperature of the solution, as well as the concentration of the solution, may be varied interchangeably with a great degree of flexibility according to the desires of the operator. Thus, by varying the concentration of dye solution, and time and temperature of application, a polarizer of any desired density may be prepared under any combination of conditions at the option of the operator.

After the dye has been applied to the polymeric material, the excess dye on the surface of the material is removed by rinsing or by wiping. The element may then be dried by any convenient means, for example, air drying at room temperature, by a stream of air or in an oven up to a temperature of 90° C. The stability of the dye allows considerable flexibility in the drying step of this process.

It may also be desirable to modify the element in some manner to improve its mechanical stability, for example, by cross-linking the polymer, as by borating, to render the polymer more water and heat insensitive. The process of borating polarizing film is described in U.S. Patents Nos. 2,554,850, issued May 29, 1951 and 2,445,581, issued July 20, 1948. The polarizers of this invention may also be bonded to a transparent support or coated, as by plastic sheets, to provide protection against physical damage. Such modifications do not affect the optical characteristics of the polarizers.

It has been stated above that the major bands of dichroism of the polarizers of this invention occur in the 350 to 370 m$\mu$ region. It should also be understood that the polarizers prepared by the process of this invention also show good dichroism at 250 m$\mu$. In addition, many of the polarizers of this invention show good dichroism in two regions, for example, the polarizer described in Example I below shows a dichroic ratio of 10 to 350 m$\mu$ and also a secondary band at 250 m$\mu$ with dichroic ratio of 5.

A polarizer may also be prepared using a combination of two or more dyes. The resulting polarizer shows the relative contributions of each, for example, by the proper selection of dyes, an absorption band may be broadened or a multiple area of dichroism may be achieved.

In some applications of the ultraviolet polarizers of this invention it may be desirable to quench the fluorescence by the addition of a material such as iodine which will absorb the fluorescent component without absorbing the ultraviolet light.

A polarizer of the present invention may be combined with a polarizer of the visible spectral regions in order to provide the combined effects of plane polarized light components in both the visible and ultra-violet regions. Such a combination visible/ultraviolet polarizer may be prepared by placing a polarizer of this invention and a visible polarizer in contiguous relationship to each other, or by incorporating a fluorescent dye into a visible polarizer during the preparation of the polarizer. As examples of suitable visible polarizers for the above-described applications, mention may be made of polarizers described generally in U.S. Patents Nos. 2,237,567, issued April 8, 1941, 2,173,304, issued September 19, 1939, and 2,255,940, issued September 16, 1941.

The following non-limiting examples illustrate the preparation of polarizers within this invention.

Example I

A sheet of polyvinyl alcohol stretched four times its cast length was clamped and placed in an aqueous solution of Brightener R/450 (sold by General Aniline and Film Corporation, N.Y., N.Y.) at room temperature for one minute, until the film was swelled. The film was removed from the dye solution and quickly stretched to its elastic limit (about 20% more than the original stretch). The film was then dried over a hot plate.

At 350 m$\mu$ the dichroic ratio of the polarizer was 10 and at 250 m$\mu$ the dichroic ratio was 5.

Example II

A polarizer was prepared according to the procedure of Example I using Brightener A (Fluorescent Brightener No. 33), sold by General Aniline and Film Corporation, N.Y., N.Y., and showed a dichoic ratio of 12 at 365 m$\mu$.

Example III

A polarizer was prepared according to the procedure of Example I using Fluorescent Brightener No. 28, NE 3353 (sold by E. I. du Pont de Nemours & Company, Inc., Wilmington, Delaware) and showed a dichroic ratio of 8 at 350 m$\mu$.

Example IV

A polarizer was prepared according to the procedure of Example I using Pontamine White BR (Brightener Agent No. 30), sold by E. I. du Pont de Nemours & Company, Inc., Wilmington, Delaware, an showed a dichoic ratio of 5 at 360 m$\mu$.

The polarizers of this invention are useful wherever polarized ultraviolet radiation is desired, for example in spectrophotometry.

Where it is desirable, an ultraviolet transmitting-visual absorbing filter may be used in conjunction with the polarizer to remove the fluorescent light.

The polarizer of this invention may also be used to provide a novel display device. Such a device comprises oriented materials stained with visibly fluorescing dyes which show a dichroism in the spectral range of the activating light, a polarizer of this invention, and an ultraviolet light source as the activating light. Since the fluorescing material selected is one that shows a dichroism in the spectral range of the activating light, the oriented material will fluoresce when its axis of orientation is parallel to the electric vector of the plane polarized ultraviolet light transmitted by the polarizer, and will darken gradually as the angle of the two axes approaches 90° until the axis of orientation of the material is at right angles to the electric vector of the plane polarized light whereby extinction occurs. By arranging segments of such oriented materials with the axes of orientation in various relationships to each other, the intensity of fluorescence of the segments may be varied according to a predetermined scheme by rotating the polarizer. The intensity of the fluorescent light is dependent upon the angular relationship of the axis of orientation of each segment to the axis of the plane polarized exciting radiations. All degrees of fluorescent light intensity may be achieved thereby. A display as described above could provide a changing image, or series of images, or even the appearance of motion, using only a simple arrangement of one light source, preferably ultraviolet, a polarizer rotatably mounted in front of the light source and the display area comprising segments of oriented matrix dyed with a fluorescent dye or dyes. If desired the various colored fluorescent dyes may be used in the oriented matrix to provide a multicolored display.

Since certain changes may be made in the above products and processes without departing from the scope of the invention herein involved, it is intended that all matter contained in the above description shall be interpreted as illustrative and not in a limiting sense.

What is claimed is:

1. A process for polarizing ultraviolet light which comprises passing ultraviolet light radiation through a substantially transparent, substantially uniaxial sheet of polymer having its optic axis in the plane of the sheet, which sheet has incorporated therein a substantially oriented sorption complex of at least one fluorescent dye on said polymer, said fluorescent dye being dichoic in the ultraviolet region of the spectrum and substantially nonabsorbing in the visible region of the spectrum, said sorption complex being a substantial absorber for ultraviolet light vibrating parallel to its axis and being substantially a nonabsorber for ultraviolet light vibrating perpendicular to its axis.

2. The process as defined in claim 1 wherein said polymer is polyvinyl alcohol.

References Cited by the Examiner

UNITED STATES PATENTS

| | | | |
|---|---|---|---|
| 2,165,974 | 7/1939 | Land | 88—65 X |
| 2,255,940 | 9/1941 | Rogers | 88—65 X |
| 2,330,718 | 9/1943 | Kallmann | 88—65 X |
| 2,970,066 | 1/1961 | Brasure. | |
| 3,043,709 | 6/1962 | Amborski | 117—7 |

FOREIGN PATENTS 828,831   2/1960   Great Britain.

OTHER REFERENCES

Barer, "Some Experiments with Polarizing Films in the Ultra-Violet," article in Journal of Scientific Instruments, vol. 26, 1949, pages 325–327 cited.

Pestiel, "Optique Cristalline," article in Compte Rendus, vol. 235, October–December 1952, pages 1384 and 1385 cited.

DAVID H. RUBIN, *Primary Examiner.*

JEWELL H. PEDERSEN, *Examiner.*

J. S. GOLDHAMMER, *Assistant Examiner.*